(12) United States Patent
Barari et al.

(10) Patent No.: US 10,417,484 B2
(45) Date of Patent: Sep. 17, 2019

(54) METHOD AND SYSTEM FOR DETERMINING AN INTENT OF A SUBJECT USING BEHAVIOURAL PATTERN

(71) Applicant: WIPRO LIMITED, Bangalore (IN)

(72) Inventors: Adrita Barari, Kolkata (IN); Ghulam Mohiuddin Khan, Bangalore (IN); Manjunath Ramachandra, Bangalore (IN)

(73) Assignee: Wipro Limited, Bangalore (IN)

( * ) Notice: Subject to any disclaimer, the term of this patent is extended or adjusted under 35 U.S.C. 154(b) by 61 days.

(21) Appl. No.: 15/653,904

(22) Filed: Jul. 19, 2017

(65) Prior Publication Data

US 2018/0349688 A1    Dec. 6, 2018

(30) Foreign Application Priority Data

May 30, 2017  (IN) .............................. 201741019002

(51) Int. Cl.
*G06Q 30/02* (2012.01)
*G06K 9/62* (2006.01)
*G06K 9/00* (2006.01)

(52) U.S. Cl.
CPC ..... *G06K 9/00342* (2013.01); *G06K 9/00718* (2013.01); *G06K 9/00771* (2013.01); *G06K 9/6227* (2013.01); *G06Q 30/0201* (2013.01)

(58) Field of Classification Search
CPC ........... G06K 9/00718; G06K 9/00711; G06K 9/00771; G06K 9/00684; G06K 9/00691; G06K 9/00697; G06K 9/00704

(Continued)

(56) References Cited

U.S. PATENT DOCUMENTS 5,724,488 A    3/1998  Prezioso
6,028,626 A    2/2000  Aviv
(Continued)

OTHER PUBLICATIONS

"A Hierarchical Approach for Visual Suspicious Behavior Detection in Aircrafts", D. Arsic, B. Hornier, B Schuller, and G. Rigoll, 2009 16th International Conference on Digital Signal Processing, Jul. 5-7, 2009. (Year: 2009).*

*Primary Examiner* — Dwayne D Bost
*Assistant Examiner* — Stephen M Brinich
(74) *Attorney, Agent, or Firm* — Finnegan, Henderson, Farabow, Garrett & Dunner, LLP

(57) ABSTRACT

The present disclosure relates to method and system for determining intent of subject using behavioural pattern by intent determination system. The intent determination system receiving video data associated with subject from one or more information sources, extracting pre-defined number of femes before target frame from video data of subject, obtaining plurality of behavioural parameters of subject for each of extracted frames, determining score for plurality of behavioural parameters of extracted femes using trained intent model, calculating weighted average score for plurality of behavioural parameters of extracted frames based on score of each of behavioural parameters, analysing emotion of subject for pre-defined number of frames based on weighted average score and determining intent of subject based on emotion of subject analysed. The present disclosure removes the need of human intervention in determining intent of subject.

21 Claims, 6 Drawing Sheets

(58) Field of Classification Search
USPC .................................. 358/103, 100, 117–118
See application file for complete search history.

(56) References Cited

U.S. PATENT DOCUMENTS

| | | | |
|---|---|---|---|
| 2005/0104727 A1* | 5/2005 | Han | G06K 9/00335 340/541 |
| 2008/0166015 A1* | 7/2008 | Haering | G01S 3/7864 382/103 |
| 2009/0131836 A1 | 5/2009 | Enohara et al. | |
| 2010/0208063 A1* | 8/2010 | Lee | G06K 9/00771 348/143 |
| 2015/0248622 A1 | 9/2015 | Myslinski | |
| 2017/0017887 A1 | 1/2017 | Waradkar | |

* cited by examiner

METHOD AND SYSTEM FOR DETERMINING AN INTENT OF A SUBJECT USING BEHAVIOURAL PATTERN

TECHNICAL FIELD

The present subject matter is related in general to the field of behaviour analysis, more particularly, but not exclusively to a method and system for determining an intent of a subject using behavioural pattern.

BACKGROUND

The technology has developed in every field presently. Researchers in cognitive science today investigate on how thoughts and feelings are reflected in bodily response systems including physiology, facial features, and body movements. Progress in these areas is accelerated by inexpensive, non-intrusive, portable, scalable, and easy to calibrate movement tracking systems. Recent study on humans shows that body language plays a significant role in determining how truthful or deceitful a person's behaviour is. Currently there are numerous systems for analysing body language of humans. Such systems may work with any commercially available camera and with existing videos cameras, thereby affording inexpensive, non-intrusive, and potentially portable and scalable estimation of body movement One such device for tracking the body movement is a Closed-circuit television (CCTV). The CCTV is a television system in which signals are not publicly distributed but are monitored for surveillance and security purposes. The CCTV relies on placement of cameras, and observation of the data obtained from cameras. Most commonly, CCTV are used for surveillance purposes at public places such as shopping malls, offices, airports and the like to protect against property theft, and vandalism.

In an example, the CCTV are used to record video footages of interrogations performed on suspected criminals. The recorded video footages are stored in a database for further processing.

In the existing methods, the video footages (in real-time or offline) are analysed by specialists in a particular field. Also, the analysis video footages are subjected to availability of good professionals in this field. Since the criminal psychologist analyse the video manually, the process becomes tedious, time consuming and cumbersome. Moreover, the existing systems are user specific, where a database is created for every individual by considering different attributes related to body of the individual. Thus, making the existing systems time consuming and cumbersome process. There is a need for an efficient mechanism for creating a generalized model for each category such as, patients, criminals, suspects, interview candidate and the like, which cars be used for determining the intent of the subject.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for determining an intent of a subject using behavioural pattern. The method may comprise receiving video data associated with a subject from one or more information sources, extracting a pre-defined number of frames before a target frame from the video data of the subject, obtaining a plurality of behavioural parameters of the subject for each of the extracted frames. The plurality of behavioural parameters may comprise body language, behaviour, eye contact response time, consistency of answer and voice characteristics associated with the subject. The method may comprise determining a score for the plurality of behavioural parameters of the extracted frames using a trained intent model. The trained intent model may be trained using a plurality of training video data associated with subjects from a plurality of categories. The method may comprise calculating a weighted average score for the plurality of behavioural parameters of the extracted frames based on the score and a weight of each of the behavioural parameters. The weight for the plurality of behavioural parameters is determined while training the intent model. The method comprises analysing emotion of the subject for the pre-defined number of frames based on the weighted average score and determining an intent of the subject based on the emotion of the subject analysed.

In an embodiment, the present disclosure relates to an intent determination system for determining an intent of a subject using behavioural pattern. The intent determination system comprises a processor and a memory communicatively coupled to the processor, where the memory stores processor executable instructions, which, on execution, may cause the intent determination system to receive video data associated with a subject from one or more information sources, extract a pre-defined number of frames before a target frame from the video data of the subject, obtain a plurality of behavioural parameters of the subject for each of the extracted frames. The plurality of behavioural parameters may comprise body language, behaviour, eye contact, response time, consistency of answer and voice characteristics associated with the subject. The intent determination system may determine a score for the plurality of behavioural parameters of the extracted frames using a trained intent model. The trained intent model may be trained using a plurality of training video data associated with subjects from a plurality of categories. The intent determination system may calculate a weighted average score for the plurality of behavioural parameters of the extracted frames based on the score and a weight of each of the behavioural parameters. The weight for the plurality of behavioural parameters is determined while training the intent model. The intent determination system analyses emotion of the subject for the pre-defined number of frames based on the weighted average score and determine an intent of the subject based on the emotion of the subject-analysed.

In an embodiment, the present disclosure relates to a non-transitory computer readable medium including instructions stored thereon that when processed by at least one processor may cause an intent determination system to receive video data associated with a subject from one or more information sources, extract a pre-defined number of frames before a target frame from the video data of the subject, obtain a plurality of behavioural parameters of the subject for each of the extracted frames. The plurality of behavioural parameters may comprise body language, behaviour, eye contact, response time, consistency of answer and voice characteristics associated with the subject. The instructions may cause the intent determination system to determine a score for the plurality of behavioural parameters of the extracted frames using a trained intent model The trained intent model may be trained using a plurality of training video data associated with subjects from a plurality of categories. The instructions may cause the intent determination system to calculate a weighted average score for the plurality of behavioural parameters of the extracted frames based on the score and a weight of each of the behavioural parameters. The weight for the plurality of behavioural parameters is determined while training the intent model. The instructions may cause the intent determination system to analyse emotion of the subject for the pre-defined number of frames based on the weighted average score and determine an intent of the subject based on the emotion of the subject analysed.

The foregoing summary is illustrative only and is not intended to be in any way limiting, in addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure. Illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
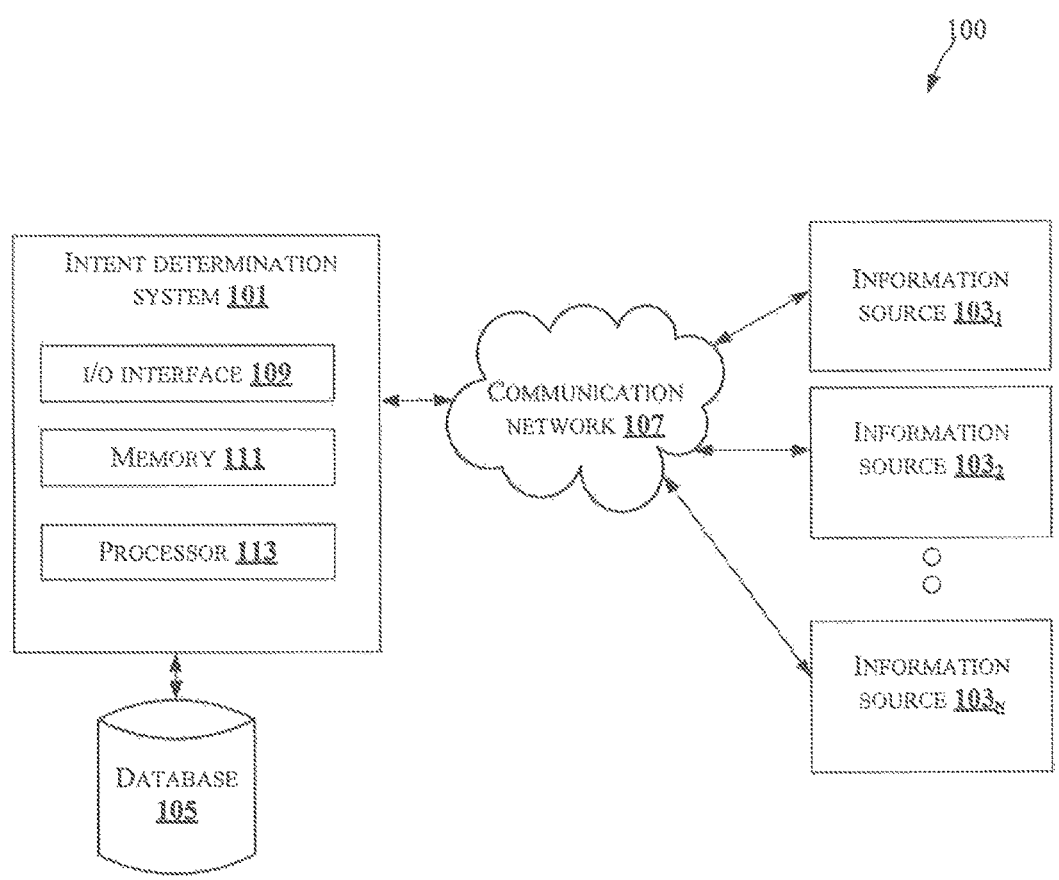
FIG. 1 illustrates an exemplary environment for determining an intent of a subject using behavioural pattern in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it Is to be understood that other embodiments may be utilized and that changes may be made without departing from the scope of the present disclosure. The following description is, therefore, not to be taken in a limiting sense.

The present disclosure relates to a method and an intent determination system for determining an intent of a subject using behavioural pattern. In an embodiment the intent of the subject may comprise one of a truthful intent and a deceitful intent. Initially, the intent determination system may receive a video data associated with the subject from different information sources. In an embodiment, the information sources may include, external databases, hospital records, criminal record databases and the like. The obtained video data may be processed to extract a pre-defined number of frames before a target frame from the video data, in an embodiment, the target frame may represent a frame at which the intent of the subject is to be determined. The intent determination system may further analyse the extracted pre-defined frames to obtain a plurality of behavioural parameters and their corresponding scores. The scores for the behavioural parameters may be determined using a trained intent model. In an embodiment, the plurality of behavioural parameters may comprise, body language, behaviour, eye contact, response time, consistency of answer and voice characteristics associated with the subject. Based on the score of the plurality of behavioural parameters and pre-determined weights of the plurality of behavioural parameters, a weighted average score may be determined for each of the behavioural parameters. Further, the intent determination system may determine the intent of the subject based on an emotion of the subject analysed. The emotion of the subject may be analysed for the pre-defined number of frames using the weighted average score. In an embodiment, if the intent is deceitful, a notification may be issued to concerned authorities of the subject for taking necessary actions. The intent determined for the subject helps concerned authorities associated with subject in understanding the intent of the subject. The intent determination system may make use of artificial intelligence and deep learning mechanism to determine the intent of the subject. The use of the artificial intelligence and deep learning mechanism eliminates the need for human intervention in determining intent of the subject.

FIG. 1 illustrates an exemplary environment for determining an intent of a subject using behavioural pattern in accordance with some embodiments of the present disclosure.

As shown in FIG. 1, the environment 100 includes an intent determination system 101 connected through a communication network 107 to an information source $103_1$, an information source $103_2$ ... and an information source $103_N$ (collectively referred as plurality of information sources 103). The communication network 107 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. In an embodiment, the plurality of information sources 103 may include, but are not limited to, databases including criminal investigations data, databases including surveillance systems data, databases including medical investigations data, database including interviewed candidate data and the like. A person skilled in the art would understand that any other information sources, not mentioned explicitly, may also be included in the present disclosure. Further, the intent determination system 101 may be connected to a database 105. The intent determination system 101 may determine an intent of the subject automatically by analysing the behavioural pattern of the subject. In an embodiment, the intent determination system 101 may include, but is not limited to, a laptop, a desktop computer, a Personal Digital Assistant (PDA), a notebook, a smartphone, a tablet and any other computing devices. A person skilled in the art would understand that, any other devices, not mentioned explicitly, may also be used in the present disclosure.

Initially, when an intent of the subject is required to be determined, the intent determination system 101 may receive a video data associated with the subject from the plurality of information sources 103. In an embodiment, the subject may include, such as, criminals, patients, interview candidate and the like based on the type of the information source. On receiving the video data, the intent determination system 101 may extract a pre-defined number of frames from the video data before a target frame. In an embodiment, the target frames may represent a frame at which the intent of the subject is to be determined. Once the pre-defined number of frames are extracted, the intent determination system 101 may obtain a plurality of behavioural parameters of the subject for each of the extracted frames. In an embodiment, the behavioural parameters of the subject may include, body language, behaviour, eye contact, response time, consistency of answer and voice characteristics associated with the subject. A person skilled in the art would understand that any other type of behavioural parameters, not mentioned explicitly, may also be included in the present disclosure. Further, in addition to the behavioural parameters, the intent determination system 101 may also determine a score for each of the plurality of behavioural parameters for each of the extracted frames using a trained intent model. In an embodiment, the score for each of the behavioural patterns may be determined by mapping each of the behavioural patterns of the subject with a corresponding behavioural parameter stored in the intent model. The trained intent model may be trained using a plurality of training video data which may be associated with subjects from a plurality of categories such as, medical field, criminal investigation field, education field and the like. A person skilled in the art would understand that any other categories, not mentioned explicitly, may also be included in the present disclosure. The intent model may be stored in the database 105. In an embodiment, the intent model may include behavioural patterns and scores for each of the subjects associated with the plurality of categories. Further, the intent determination system 101 may calculate a weighted average score for the plurality of behavioural parameters of the extracted frames based on the score of each of the behavioural parameters and weights of the plurality of behavioural parameters. In an embodiment, the weights for the plurality of behavioural parameters are determined during training of intent model. Based on the weighted average score, the intent determination system 101 may analyse emotion of the subject for the pre-defined number of frames. In an embodiment, analysing the emotion of the subject may include identifying at least one of a negative weighted average score and a positive weighted average score for the extracted video frames. The intent determination system 101 may determine the intent of the subject based on the emotion of the subject analysed. In an embodiment, the intent of the subject may be one of a truthful intent and a deceitful intent. In an embodiment, the intent of the subject may be determined as deceitful on identifying negative weighted average score to be greater than positive weighted average score. Similarly, the intent of the subject may be determined as truthful on identifying positive weighted score to be greater than negative weighted average score.

The intent determination system 101 includes an I/O interface 109, a memory 111 and a processor 113. The I/O interface 109 may be configured to receive video data from the plurality of information sources 103.

The received information from the I/O interfaces 109 may be stored in the memory ill. The memory ill is communicatively coupled to the processor 113 of the intent determination system 101. The memory 111 may also store processor instructions which may cause the processor 113 to execute the instructions for determining the intent of the subject using behavioural patterns.

Figure 2A:
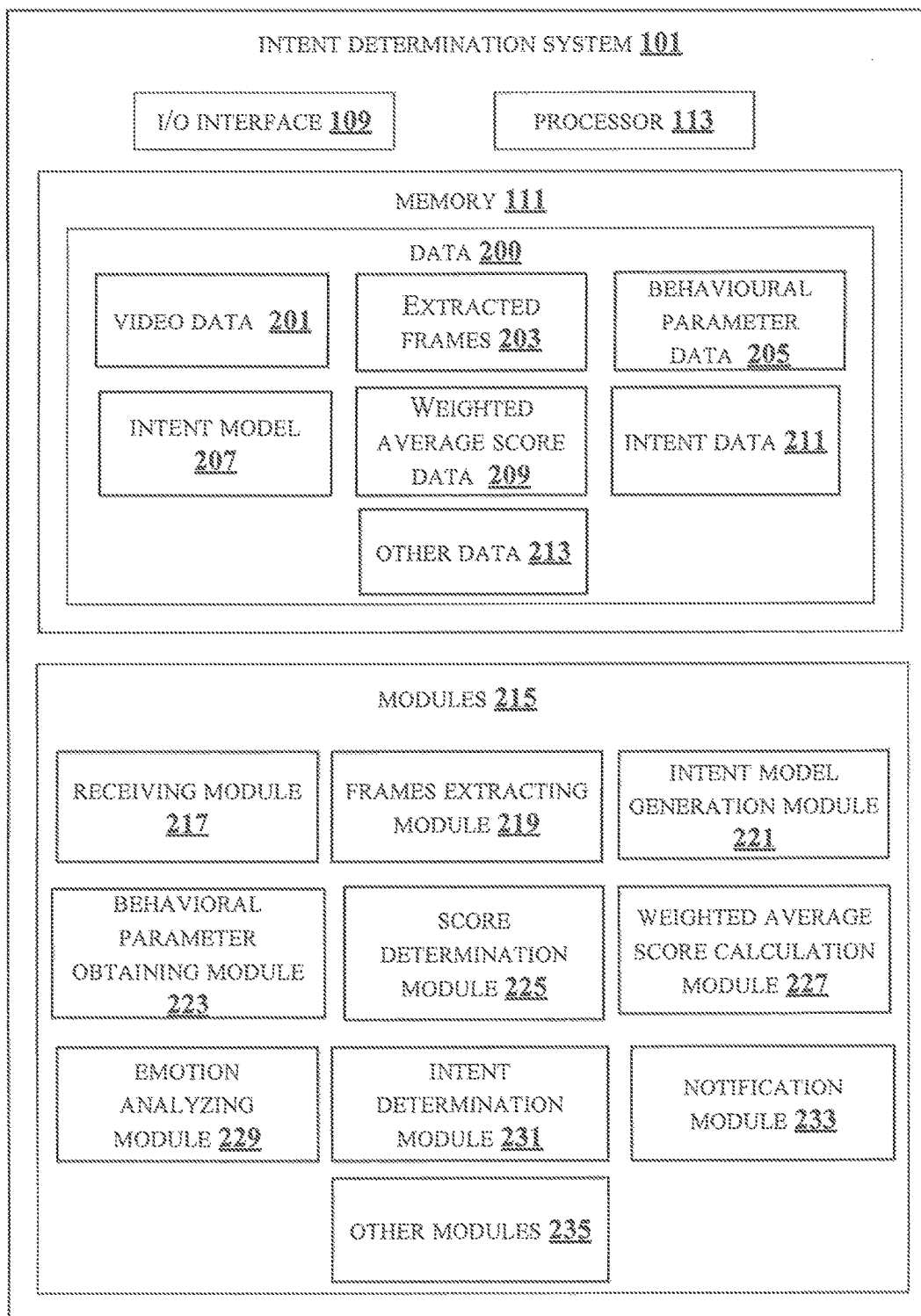
FIG. 2a shows a detailed block diagram of an intent determination system in accordance with some embodiments of the present disclosure.

FIG. 2a shows a detailed block diagram of an intent determination system in accordance with some embodiments of the present disclosure.

Data 200 and one or more modules 215 of the intent determination system 101 are described herein in detail. In an embodiment, the data 200 includes video data 201, extracted frames 203, behavioural parameter data 205, intent model 207, weighted average score data 209, intent data 211 and other data 213.

The video data 201 may comprise video footage of the subject. The video data 201 may be received from one or more of the plurality of information sources 103. In an embodiment, the video footage may be obtained from a video capturing device placed at the location, where a surveillance of the subject is required. For example, video camera located at hospitals for monitoring the behaviour of the patients.

The extracted frames 203 may comprise the pre-defined number of frames before a target frame from the video data 201. The pre-defined number of frames may be extracted for analysing the behaviour parameter of the subject at each instant of the frames.

The behavioural parameter data 205 may comprise analysis of the behaviour and emotion of the subject. The behavioural parameter data 205 may comprise body language, behaviour, eye contact, response time, consistency of answer and voice characteristics associated with the subject.

The intent model 207 may comprise the behavioural parameters and corresponding scores of the behavioural parameters for each of the subjects associated with the plurality of categories. In an embodiment, the intent model 207 may be stored in the database 105.

The weighted average score data 209 may comprise the average weighted score for each of the plurality of behavioural parameters of the subject for the extracted frames 203. The weighted average score data 209 may be calculated based on the score of each of the behavioural parameters and weights of the plurality of behavioural parameters.

The intent data 211 may comprise the intent of the subject. The intent of the subject may be either truthful intent or a deceitful intent. For example, in criminal investigation filed, the intent of the subject under examination may be determined as either truthful or deceitful.

The other data 213 may store data, including temporary data and temporary files, generated by modules 215 for performing the various functions of the intent determination system 101.

In an embodiment, the data 200 in the memory 111 are processed by the one or more modules 215 of the intent determination system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 215 when configured with the functionality defined in the present disclosure will result in a novel hardware.

In one implementation, the one or more modules 215 may include, but are not limited to, a receiving module 217, frames extracting module 219, an intent model generation module 221, a behavioural parameter obtaining module 223, a score determination module 225, a weighted average score calculation module 227, an emotion analysing module 229, an intent determination module 231 and a notification module 233. The one or more modules 215 may also comprise other modules 235 to perform various miscellaneous functionalities of the intent determination system 101. It will be appreciated that such modules 215 may be represented as a single module or a combination of different modules 215.

The receiving module 217 may receive the video data 201 associated with the subject from the one or more of the plurality of information sources 103. The video data 201 may comprise the video footage along with audio associated with the subject.

The frames extracting module 219 may extract the predefined number of frames before the target frame from the video data 201. The target frame may represent the frame at which the intent of the subject is required to be determined. For example, consider a scenario where the intent of the subject needs to be determined ax the tenth frame of the video data 201. To determine the intent at tenth frame, the first nine frames may be extracted for analysis by the frames extracting module 219.

Figure 2B:
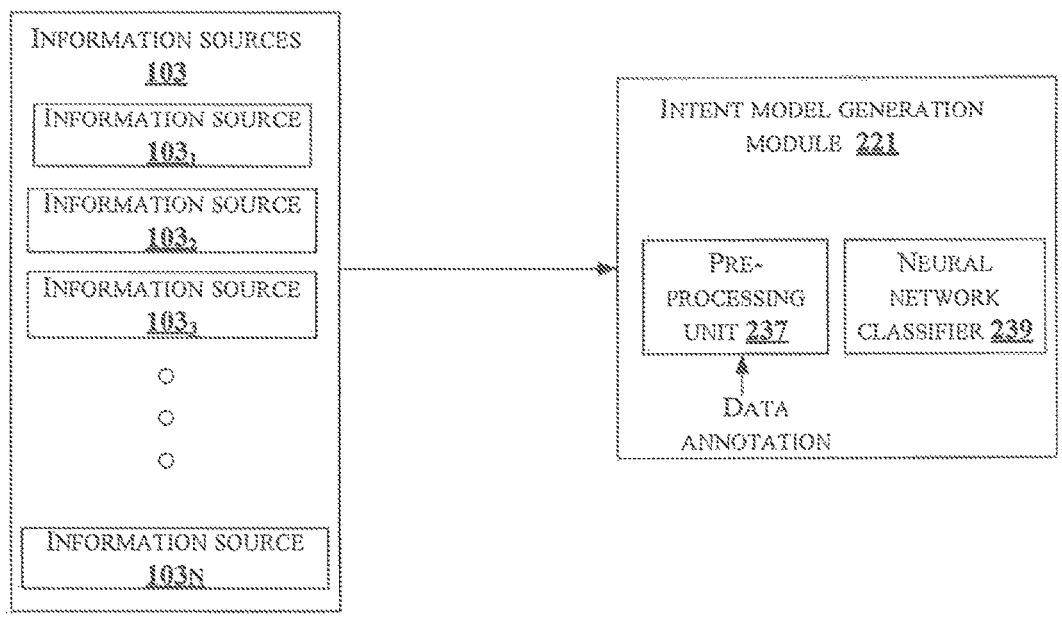
FIG. 2b shows an intent model generation module in accordance with some embodiments of the present disclosure.

The intent model generation module 221 may generate an intent model 207 based on the plurality of training video data. The intent model 207 may be trained using a plurality of training video data associated with subjects from a plurality of categories. FIG. 2b shows an intent model generation module in accordance with some embodiments of the present disclosure. As shown in FIG. 2b, the video data 201 from the plurality of information sources 103 may be used to obtain the video footages of the subject. The obtained video footages are from, the plurality of categories which may be used as a training data to train the intent model 207. Further, the video data 201 from the plurality of information sources 103 is received by a pre-processing unit 237 of the intent model generation module 221. The pre-processing unit 237 may be configured to extract plurality of behavioural parameters of the subject by processing the video data 201, Further, the extracted frames 203 are annotated by the intent model generation module 221. In an embodiment, the data may be annotated in a manual or semi-automated way for all the behavioural parameters of the extracted frames 203. The annotated data may be passed through a Neural Network (NN) classifier 239 for training. The NN classifier 239 may receive the annotated data from the pre-processing unit 237. The NN classifier 239 may determine scores for the extracted behaviour parameters. Based on the results of the NN classifier 239, the intent model 207 which may determine the intent is generated. The intent model 207 generated may not be specific to any particular type of subject. The generated intent model 207 may comprise the behavioural parameters and corresponding scores for each of the behavioural parameters of the plurality of categories of the subject. Further, the intent model generating module 221 determines weights of the extracted behavioural parameters based on the plurality of training data. The annotated frames for each of the emotions may be passed through the NN classifier 207. The NN classifier 207 may learn and store the weights for different emotions of the behavioural parameters. The learnt weights of the behavioural parameters are stored along with the intent model 207.

The behavioural parameter obtaining module 223 may obtain the plurality of behavioural parameters of the subject for each of the extracted frames 203 of the video data 201. The behavioural parameters may comprise body language, behaviour, eye contact, response time, consistency of answer, micro-expression and voice characteristics such as, tone speed, volume and the like associated with the subject. For example, consider the video data received is associated with a patient suffering from mental disorders. The behavioural parameters of the patient such as, "consistency of answers" are identified to check if the responses provided by the patient are consistent with their mental state. Thus, by utilizing the body language decoding from the video data 201 obtained from the information sources 103, the behavioural parameters are determined.

The score determination module 225 may determine a score for each of the plurality of behavioural parameters obtained for the extracted frames 203. The score determination module 225 may determine the score by using the intent model 207. The score determination module 225 may determine the score for each of the behavioural parameters by mapping each of the behavioural parameters of the subject with a corresponding behavioural parameter stored in the intent model 207. In an embodiment, the score determined for each of the behavioural parameters may be a vector value. For example, the score for emotion behavioural parameters may be "anger=0.4", "happiness"=0.05, "sadness"=0.3, "depression"=0.25.

The weighted average score calculation module 227 may calculate the weighted average score for the plurality of behavioural parameters of the extracted frames 203 based on the corresponding score of each of the plurality of behavioural parameters. The weighted average score calculation module 227 may use the learnt weights from the generated intent model 207 and use it to predict the weights of each emotion for the plurality of behavioural parameters of the subject. In an embodiment, the weighted average score calculation is a calculation based on the target frame. For example, suppose N is 50, which indicates that the behavioural parameters needs to be assessed in past 50 frames to predict intent in the 50$^{th}$ frame. For instance, if the trend in the last 50 frame indicates that an emotion anger is increasing, then it may be predicted that the behaviour of the subject may turn aggressive. The weighted average score may be derived from the behavioural average scores of all 50 frames. The 50$^{th}$ frame is assigned least weight, the 49$^{th}$ frame more than that and so on. Below equations illustrates a formula for calculating a weighted average score for N frames.

Weighted average score=(Weight assigned to Nth frame)×(Emotion scores in N$^{th}$ frame)+(Weight assigned to (N−1)$^{th}$ frame)×(Emotion scores in (N−1)$^{th}$ frame)+ . . . +(Weight assigned to current frame)×(Emotion scores in current frame)/(Weight assigned to N$^{th}$ frame)+(Weight assigned to (N−1) frame)+ . . . +(Weight assigned to current frame  (1)

Where N=target frame.

In an embodiment, If the weighted average score for any negative behavioural parameter reaches above a threshold, the behaviour parameter in such case may be considered as a potential threat. The emotion analysing module 229 may analyse the emotion of the subject based on the weighted average score of each of the plurality of behavioural parameters. The emotion analysing module 229 may analyse the emotion of the subject by identifying at least one of the negative weighted average score and positive weighted average score for the extracted video frames.

The intent determination module 231 may determine the intent of the subject based on the emotion analysed for the subject. The intent determination module 231 may determine the intent of the subject as one of the truthful intent and the deceitful intent. The intent determination module 231 may determine the intent of the subject as deceitful if the negative weighted average score is greater than positive weighted average score. Similarly, the intent of the subject is determined as truthful if the positive weighted score is greater than negative weighted average score. For example, if the negative weighted average score is increasing over the pre-defined frames, then the intent of the subject is determined as "deceitful".

The notification module 233 may provide a notification to concerned authorities of the subject regarding the intent of the subject. For example, if the subject is a patient, the notification regarding the intent of the subject is sent to the associated doctor or nurse who may be monitoring the patient.

Figure 3:
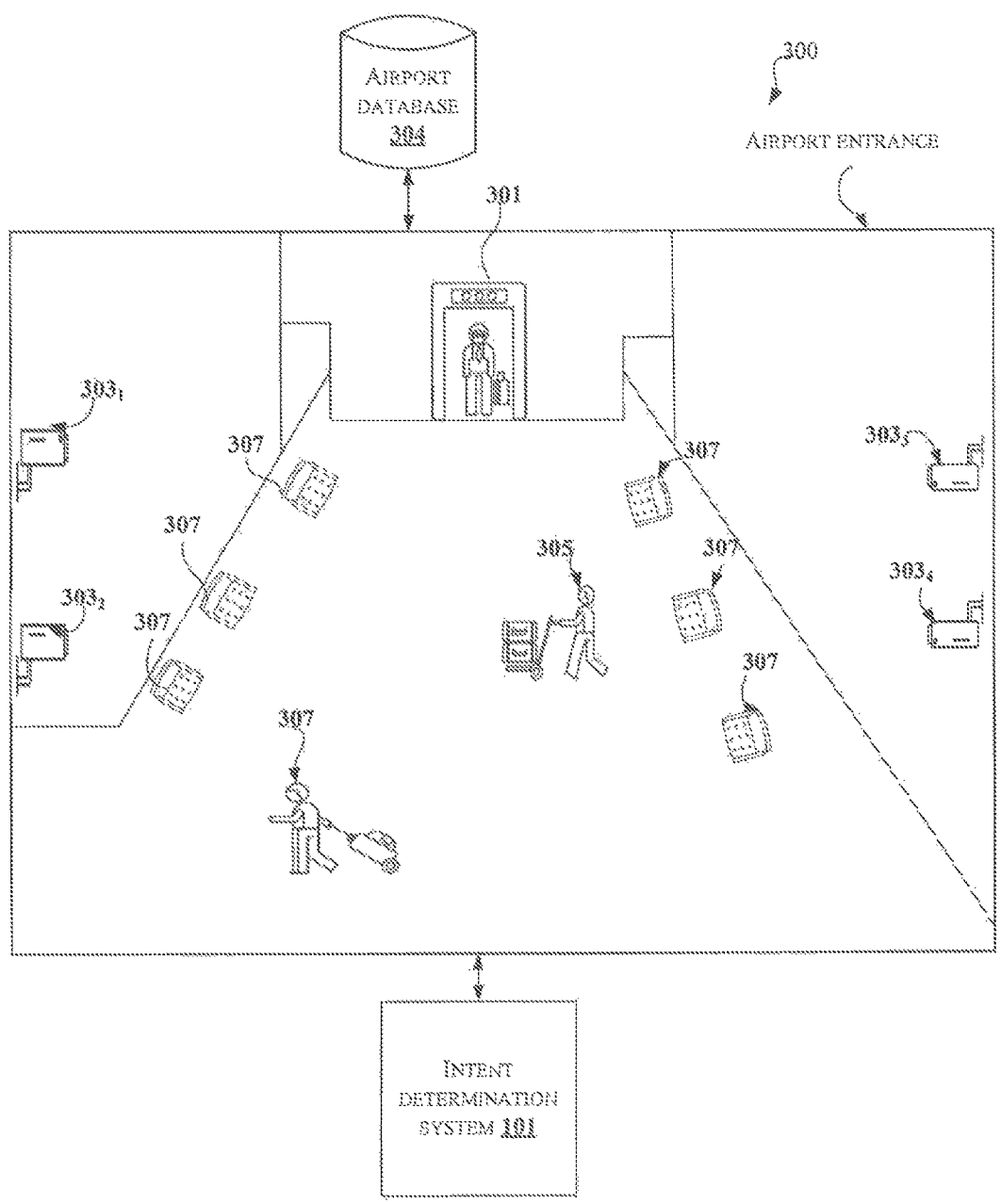
FIG. 3 shows an exemplary representation of airport scenario for determining an intent of subject in accordance with some embodiments of the present disclosure.

FIG. 3 shows an exemplary representation of airport scenario for determining an intent of subject in accordance with some embodiments of the present disclosure.

As shown in FIG. 3, the environment 300 illustrates a scenario of determining an intent of a subject for the airport scenario in an exemplary embodiment of the present disclosure. The environment 300 illustrates the airport entrance scenario connected to the intent determination system 101. The environment 300 comprises entrance gate 301, video camera 303$_1$, video camera 303$_2$ video camera 303$_3$ and video camera 303$_4$ (collectively called as video cameras 303), an airport database 304, a subject 305 and a subject 307 and chairs 309$_1$ . . . chair 309$_6$. The intent determination system 101 may be connected through the communication network (not shown in FIG. 3) to the airport database 304. A person skilled in the art would understand that FIG. 3 is an exemplary embodiment and the scenario may also be included in any other fields. The airport database 304 may receive details regarding the subjects in the airport. The video cameras 303 in the airport may be required to monitor the subjects inside the airport, entering and moving out the airport to detect any suspicious behaviour. Consider, the subject 307 exhibits a suspected behaviour inside the airport. The video camera 303$_2$ may capture the movement and activity of the subject 307. The details from the video camera 303$_2$ may be stored in the airport database 304. Initially, the intent determination system 101 may receive the details of the video data associated with the subject 307 from the airport database 304. In an embodiment the video data may comprise ten frames. In an embodiment, the ten frames may be captured starting from the airport entrance 301. On receiving the video data, the intent determination system 101 may extract nine frames from the video data. The intent of the subject 307 may be required to be determined at tenth frame. Once the nine frames are extracted, the intent determination system 101 may obtain the behavioural parameters associated with the subject 307. For example, the audio characteristics of the subject 307, facial expressions, eye movement and the like. A person skilled in the art would understand that any other behavioural parameters not mentioned explicitly for the subject 307 may also be included in the present disclosure. The intent determination system 101 may also determine scores for each of the behavioural parameters of the subject 307 at all the nine frames. The intent determination system 101 may use the intent model 207 generated based on training data associated with subject from plurality of categories, in an embodiment, one such category may correspond to the airport field. Once the scores are determined, the intent determination system 101 may calculate the weighted average score for each of the behavioural parameters of the subject 307 for the nine frames. The weighted average score may be calculated based on the corresponding scores of the behavioural parameters of the subject 307 and weights assigned for each of the behavioural parmaters. Once, the weighted average score is calculated, the intent determination system 101 may analyse the emotion of the subject 307 during the nine frames based on the weighted average score. For example, the score for the negative weighted average score such as, anger is more than positive weighted average score such as, happiness. Once the emotion of the subject 307 is analysed, the intent determination system 101 may determine the intent of the subject 307. For example, the weighted average score for the negative parameters such as, anger, depression of the subject 307 are greater than the positive weighted average score. The intent determination system 101 may determine the intent of the subject 307 as deceitful.

Figure 4:
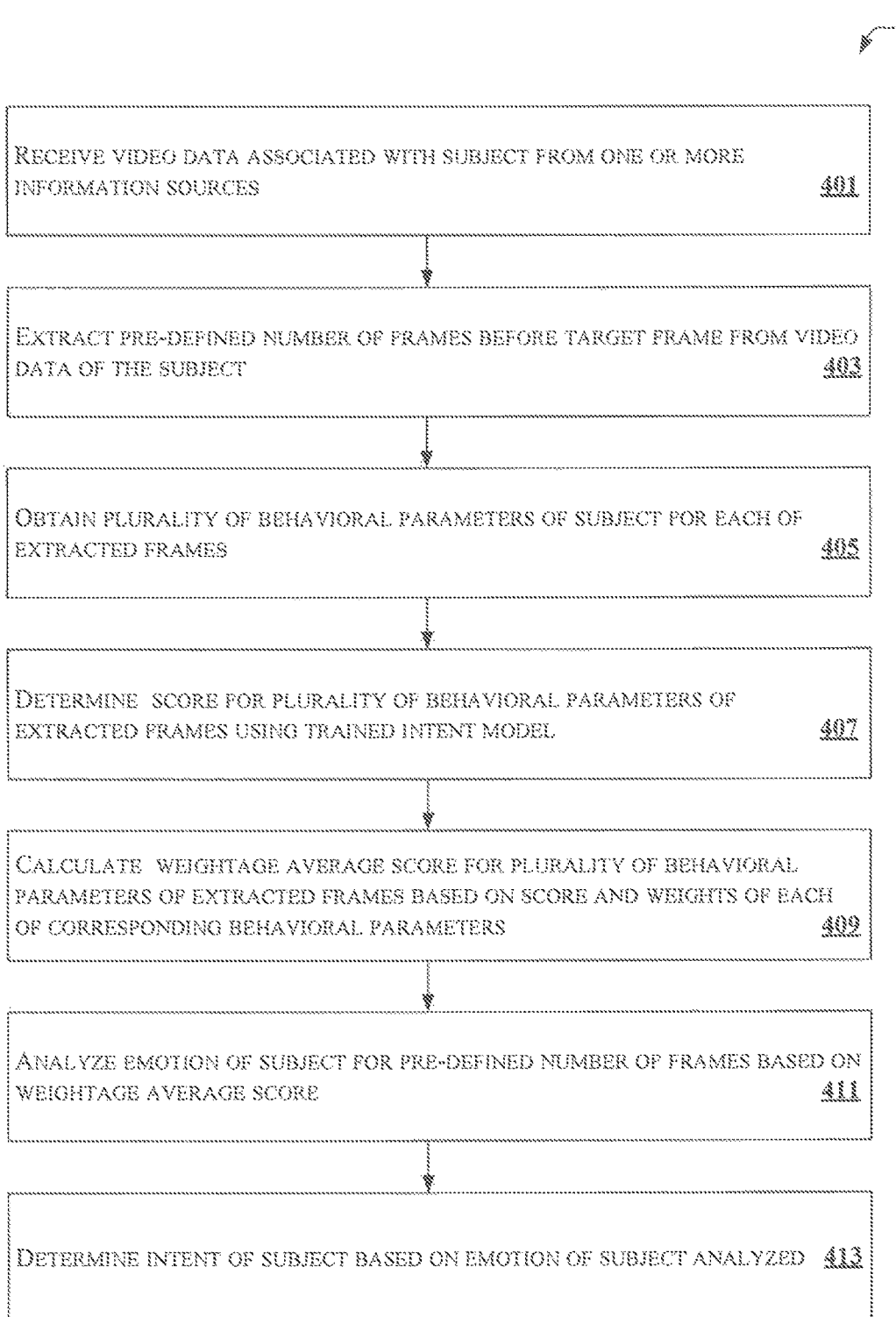
FIG. 4 illustrates a flowchart showing a method for determining an intent of a subject using behavioural pattern, in accordance with some embodiments of present disclosure.

FIG. 4 Illustrates a flowchart showing a method for determining an intent of a subject using behavioural pattern in accordance with some embodiments of present disclosure.

As illustrated in FIG. 4, the method 400 includes one or more blocks for determining an intent of a subject using behavioural pattern. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, receiving, by the receiving module 217, the video data 201 associated with the subject from the one or more information sources of the plurality of information sources 103.

At block 403, extracting, by the frames extracting module 219, the pre-defined number of frames before the target frame from the video data 201 of the subject. In an embodiment, the target frame represents the frame at which the intent of the subject is to be determined.

At block 405, obtaining, by the behavioural parameter obtaining module 223, the plurality of behavioural parameters of the subject for each of the extracted frames 203. The plurality of behavioural parameters comprises body language, behaviour, eye contact, response time, consistency of answer and voice characteristics associated with the subject.

At block 407, determining, by the score determination module 225, the score for the plurality of behavioural parameters of the extracted frames 203 using the intent model 207. Its an embodiment, the intent model 207 is trained using a plurality of training video data 201 associated with subjects from the plurality of categories.

At block 409, calculating, by the weighted average score calculation module 227, the weighted average score for the plurality of behavioural parameters of the extracted frames 203 based on the score and the weight of each of the behavioural parameters. The weight for the plurality of behavioural parameters is determined while training the intent model.

At block 411, analysing, by the emotion analysing module 229, the emotion of the subject for the pre-defined number of frames based on the weighted average score.

At block 413, determining, by the intent determination module 231 an intent of the subject based on the emotion of the subject analysed.

Figure 5:
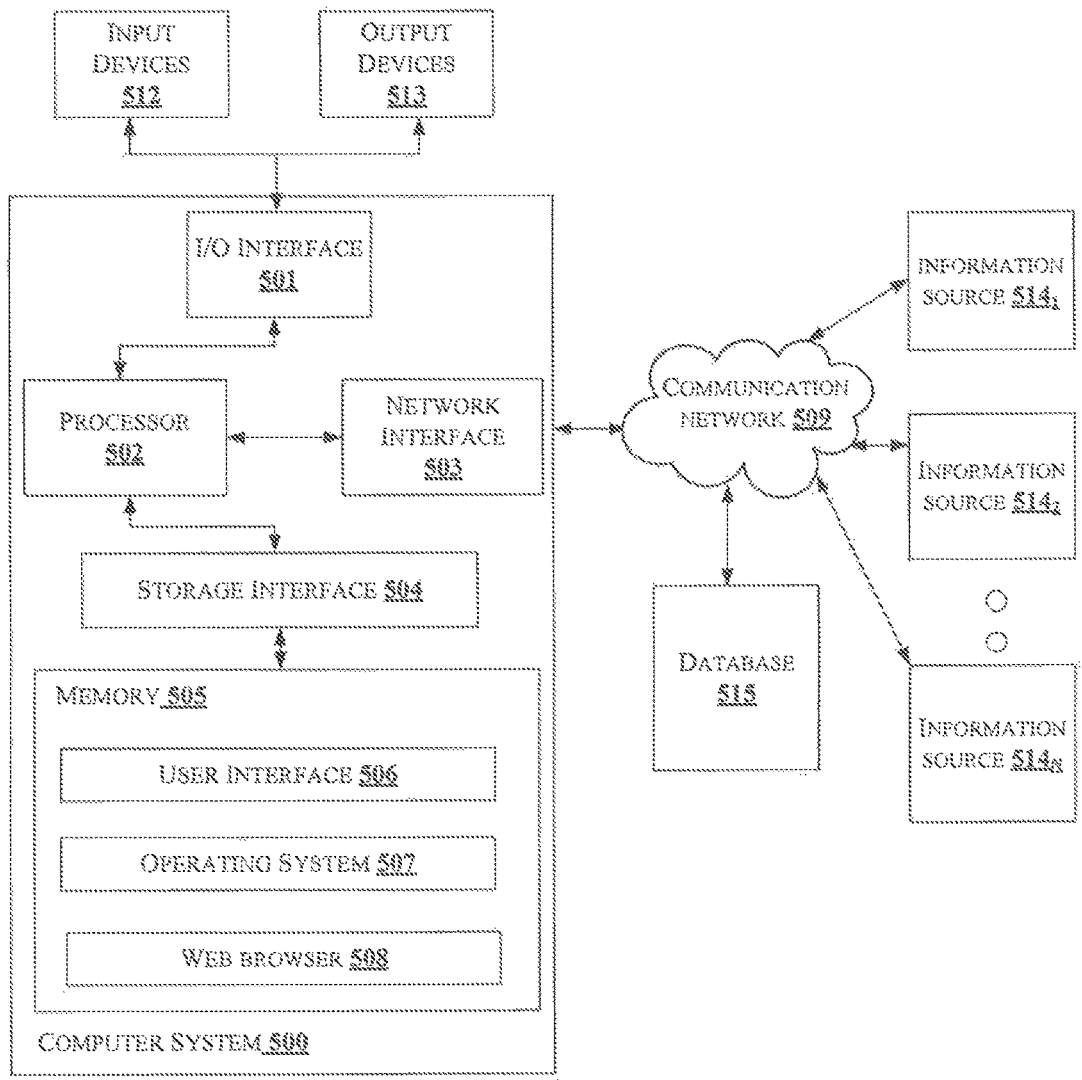
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the intent determination system 101. The computer system 500 may comprise a central processing unit ("CPU" or "processor") 502. The processor 502 may comprise at least one data processor for determining an intent of a subject using behavioural pattern. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, lax machine, dongle, biometric reader, microphone, touch screen, touchpad, trackball, stylus, seamier, storage device, transceiver, video device/source, etc. The output device may be a printer, fax machine, video display (e.g., cathode ray tube (CRT), liquid crystal display (LCD), light-emitting diode (LED), plasma, Plasma display panel (PDF), Organic light-emitting diode display (OLED) or the like), audio speaker, etc.

In some embodiments, the computer system 500 consists of an intent determination system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct Interconnection, local area network (LAN), wide area network (WAN), wireless network (e.g., using Wireless Application Protocol), the Internet, etc. Using the network interface 503 and the communication network 509, the computer system 500 may communicate with an information source $514_1$, an information source $514_2$, . . . . An information source $514_N$ (collectively referred as plurality of information sources 514) and a database 515. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 Includes, but is not limited to, a direct Interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 503 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Fiat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store Instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The present disclosure helps in determining an intent of the subject.

An embodiment of the present disclosure makes use of artificial intelligence and deep learning mechanism to determine the intent of the subject. Thus, removing the need for human interventions.

An embodiment of the present disclosure provides a methodology for determining the intent of the user in any field.

The described operations may be implemented as a method, system or article of manufacture using standard programming and/or engineering techniques to produce software, firmware, hardware, or any combination thereof The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.). volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and

| Referral numerals: | |
| --- | --- |
| Reference Number | Description |
| 100 | Environment |
| 101 | Intent determination system |
| 103 | Plurality of information sources |
| 105 | Database |
| 107 | Communication network |
| 109 | I/O interface |
| 111 | Memory |
| 113 | Processor |
| 200 | Data |
| 201 | Video data |
| 203 | Extracted frames |
| 205 | Behavioural parameter data |
| 207 | Intent model |
| 209 | Weighted average score data |
| 211 | Intent data |
| 213 | Other data |
| 215 | Modules |
| 217 | Receiving module |
| 219 | Frames extracting module |
| 221 | Intent model generation module |
| 223 | Behavioural parameter obtaining module |
| 225 | Score determination module |
| 227 | Weighted average score calculation module |
| 229 | Emotion analysing module |
| 231 | Intent determination module |
| 233 | Notification module |
| 235 | Other modules |
| 237 | Pre-processing unit |
| 239 | Neural Network classifier |

What is claimed is:

1. A method for determining an intent of a subject using behavioural patterns, the method comprising:
   receiving, by an intent determination system, video data associated with a subject from one or more information sources;
   extracting, by the intent determination system, a pre-defined number of frames before a target frame from the video data of the subject;
   obtaining, by the intent determination system, a plurality of behavioural parameters of the subject for each of the extracted frames, wherein the plurality of behavioural parameters comprises body language, behaviour, eye contact, response time, consistency of answer and voice characteristics associated with the subject;
   determining, by the intent determination system, a score for the plurality of behavioural parameters of the extracted frames using a trained intent model, wherein the trained intent model is trained using a plurality of training video data associated with subjects from a plurality of categories and wherein the trained intent model comprises behavioural patterns and scores for each of the subjects associated with the plurality of categories;
   calculating, by the intent determination system, a weighted average score for the plurality of behavioural parameters of the extracted frames based on the score and a weight of each of the behavioural parameters, wherein the weight for the plurality of behavioural parameters is determined while training the intent model;
   analysing, by the intent determination system, emotion of the subject for the pre-defined number of frames based on the weighted average score; and
   determining, by the intent determination system, an intent of the subject based on the emotion of the subject analysed.

2. The method as claimed in claim 1, wherein the target frame represents a frame at which the intent of the subject is to be determined.

3. The method as claimed in claim 1, wherein determining the score for each of the plurality of behavioural patterns comprises mapping each of the behavioural patterns of the subject with a corresponding behavioural parameter stored in the intent model.

4. The method as claimed in claim 1, wherein analysing the emotion of the subject comprises identifying at least one of negative weighted average score and positive weighted average score for the extracted video frames.

5. The method as claimed in claim 1, wherein the intent of the subject comprises one of a truthful intent and a deceitful intent.

6. The method as claimed in claim 5, wherein the intent of the subject is determined as deceitful on identifying negative weighted average score to be greater than positive weighted average score.

7. The method as claimed in claim 5, wherein the intent of the subject is determined as truthful on identifying positive weighted average score to be greater than negative weighted average score.

8. An intent determination system for determining an intent of a subject using behavioural patterns, comprising:
   a processor; and
   a memory communicatively coupled to the processor, wherein the memory stores processor instructions, which, on execution, causes the processor to:
   receive video data associated with a subject from one or more information sources;
   extract a pre-defined number of frames before a target frame from the video data of the subject;
   obtain a plurality of behavioural parameters of the subject for each of the extracted frames, wherein the plurality of behavioural parameters comprises body language, behaviour, eye contact, response time, consistency of answer and voice characteristics associated with the subject;
   determine a score for the plurality of behavioural parameters of the extracted frames using a trained intent model, wherein the trained intent model is trained using a plurality of training video data associated with subjects from a plurality of categories, and wherein the trained intent model comprises behavioural patterns and scores for each of the subjects associated with the plurality of categories;
   calculate a weighted average score for the plurality of behavioural parameters of the extracted frames based on the score and a weight of each of the behavioural parameters, wherein the weight for the plurality of behavioural parameters is determined while training the intent model;
   analyse emotion of the subject for the pre-defined number of frames based on the weighted average score; and
   determine an intent of the subject based on the emotion of the subject analysed.

9. The intent determination system as claimed in claim 8, wherein the target frame represents a frame at which the intent of the subject is to be determined.

10. The intent determination system as claimed in claim 8, wherein determining the score for each of the plurality of behavioural patterns comprises mapping each of the behavioural patterns of the subject with a corresponding behavioural parameter stored in the intent model.

11. The intent determination system as claimed in claim 8, wherein analysing the emotion of the subject comprises identifying at least one of negative weighted average score and positive weighted average score for the extracted video frames.

12. The intent determination system as claimed in claim 8, wherein the intent of the subject comprises one of truthful intent and deceitful intent.

13. The intent determination system as claimed in claim 12, wherein the intent of the subject is determined as deceitful on identifying negative weighted average score to be greater than positive weighted average score.

14. The intent determination system as claimed in claim 12, wherein the intent of the subject is determined as truthful on Identifying positive weighted score to be greater than negative weighted average score.

15. A non-transitory computer readable medium including instruction stored thereon that when processed by at least one processor cause an intent determination system to perform operation comprising:
   receiving video data associated with a subject from one or more information sources;
   extracting a pre-defined number of frames before a target frame from the video data of the subject;
   obtaining a plurality of behavioural parameters of the subject for each of the extracted frames, wherein the plurality of behavioural parameters comprises body language, behaviour, eye contact, response time, consistency of answer and voice characteristics associated with the subject;
   determining a score for the plurality of behavioural parameters of the extracted frames using a trained intent model, wherein the trained intent model is trained using a plurality of training video data associated with subjects from a plurality of categories, and wherein the trained intent model comprises behavioural patterns and scores for each of the subjects associated with the plurality of categories;
   calculating a weighted average score for the plurality of behavioural parameters of the extracted frames based on the score and a weight of each of the behavioural parameters, wherein, the weight for the plurality of behavioural parameters is determined while training the intent model;
   analysing emotion of the subject for the pre-defined number of frames based on the weighted average score; and
   determining an intent of the subject based on the emotion of the subject analysed.

16. The medium as claimed in claim 15, wherein the target frame represents a frame at which the intent of the subject is to be determined.

17. The medium as claimed in claim 16, wherein determining the score for each of the plurality of behavioural patterns comprises mapping each of the behavioural patterns of the subject with a corresponding behavioural parameter stored in the intent model.

18. The medium as claimed in claim 15, wherein analysing the emotion of the subject comprises identifying at least one of negative weighted average score and positive weighted average score for the extracted video frames.

19. The medium as claimed in claim 15, wherein the intent of the subject comprises one of a truthful intent and a deceitful intent.

20. The medium as claimed in claim 19, wherein the intent of the subject is determined as deceitful on identifying negative weighted average score to be greater than positive weighted average score.

21. The medium as claimed in claim 19, wherein the intent of the subject is determined as truthful on identifying positive weighted score to be greater than negative weighted average score.

* * * * *